May 18, 1965

H. R. GREENE 3,184,607

CHARGE GATE

Filed July 31, 1962

INVENTOR
HAROLD R. GREENE
BY
Sughrue, Rothwell, Mion and Zinn
ATTORNEYS

United States Patent Office 3,184,607

Patented May 18, 1965

3,184,607
CHARGE GATE

Harold R. Greene, New Shrewsbury, N.J., assignor to Electronic Associates Inc., Long Branch, N.J., a corporation of New Jersey Filed July 31, 1962, Ser. No. 213,633
14 Claims. (Cl. 307—88.5)

This invention relates generally to a conditional gating system, and, more specifically, to an improved capacitor-coupled conditional charge gating system.

A charge gate may be defined as a device which stores logical binary input information, as a charge on a capacitor, and effects a transfer of this information to an output circuit in the form of an output pulse under the control of a timing signal when a predetermined logical relationship exists between the input information.

The need frequently arises in modern control systems to generate pulse-type signals in response to plural bilevel input signals. In many cases the bilevel signals are the output signals from a switching array or plurality of flip-flops, and the pulse output produced in response to the bilevel input is used to actuate a flip-flop or other binary storage device, or to perform conditional gating functions with this flip-flop.

It is known to utilize coupling capacitors in combination with various forms of switching and gating devices such as appear in the input circuits of a flip-flop device wherein the input signal to the flip-flop may be dependent upon the preceding states of these flip-flops. In such instances, the coupling capacitor serves as a memory device which is charged when a predetermined condition of the associated flip-flop occurs and which essentially retains its charge until the information stored therein is extracted. These known gating devices, although serving to separate in time the functional operation of reading in and reading out information, suffer from the disadvantage of generating erroneous signals and a general inability to provide fan-out capabilities.

The present invention relates to a capacitor-coupled conditional gating system which utilizes a transistor for amplifying the charge stored upon a capacitor in order to provide fan-out of the output signals. The particular arrangement of circuitry also permits for improved operating speeds and generally eliminates generation of spurious output signals because of improved noise margins.

The principal object of this invention is to provide increased speed, improved noise margins, and fan-out capabilities in an improved capacitor-coupled conditional gating system incorporating a transistor.

Another object of this invention is to provide a new and improved conditional charge gating circuit for controlling the flow of signal information therethrough.

A more specific object is to provide an improved charge gate which amplifies input charge.

A further object of this invention is to provide a new and improved charge gate which is economical, compact and efficient in operation.

Other objects, features and many of the attendant advantages of this invention will become apparent from the following detailed description taken in connection with the accompanying drawing wherein.

Figure 1:
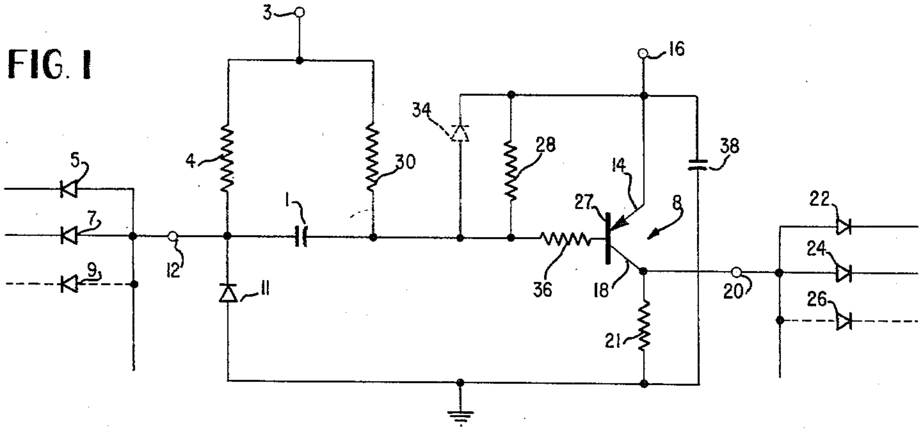
FIG. 1 is a circuit diagram of a preferred embodiment of a charge gate in accordance with this invention.

Referring now to the drawing, and, more particularly, to FIG. 1 thereof, there is illustrated a charge gate embodying the features of the present invention. Generally considered, the charge gating circuit of FIG. 1 comprises a capacitor 1 utilized to transfer a charge to a transistor 8. The input side of capacitor 1 is connected via a resistor 4 to a terminal 3 which in turn is connected to a source of positive potential, not shown. Also connected to the input side of the capacitor 1 is a plurality of normally conducting fan-in diodes, only three of which are shown at 5, 7, and 9, and a noise suppression diode 11. The common juncture of the fan-in diodes, diode 11, resistor 4, and the input side of capacitor 1 is designated 12 and is considered the input terminal to the present gate.

Transistor 8 is a junction transistor, and, although shown in the drawing as a PNP type, may be an NPN type transistor if the polarity of the associated circuitry is reversed. The transistor 8 has its emitter 14 coupled to a terminal 16 which is connected to another source of positive potential, not shown. The collector 18 of transistor 8 is connected both to an output terminal 20 and through a resistive element 21 to ground. In practice, the terminal 20 is coupled to a plurality of fan-out diodes 22, 24, 26 so as to distribute the output signals to a plurality of stations, such as flip-flops or the like.

The base 27 of transistor 8 may be coupled directly to the juncture of resistance members 28 and 30, and the resistance members 28 and 30, together with the constant voltage sources connected to terminals 3 and 16, form a biasing circuit for the transistor 8. The Thevenin equivalent voltage of resistances 28 and 30 is selected to provide a reverse bias at the base of transistor 8 and thus determine the trigger response level of the charge gate. By this arrangement, the transistor 8 is normally biased to its off condition and will remain non-conductive until base 27 is driven sufficiently negative to overcome the effect of the positive back-bias. This biasing arrangement, inter alia, prevents the system from generating undesirable output signals in response to extraneous noise signals which may occur.

Although the specific amplitudes and polarities of the potential sources connected to terminals 3 and 16 are not critical, it is important to over-all operation that terminal 3 be maintained more positive than terminal 16. In describing the over-all operation of the present gate circuit, it is presumed that terminal 3 is at +12 volts D.C. while the terminal 16 is at +4 volts D.C. for the condition of the particular input signals illustrated in FIG. 2. Although the present gate may operate synchronously as well as asynchronously, the synchronous mode of operation will be considered for purposes of illustration. To this end, the diode 5 is connected to a source of trigger or clock pulses and the diodes 7 and 9 are connected to suitable sources of bilevel signal information. The trigger pulse as well as the bilevel information signal is considered at binary 0 or a low level when they are at 0 volt, and they are considered at a binary 1 or high level when they are at +4 volts.

If the fan-in information diodes 7 and 9 are each at their low level state and the trigger diode 5 is also at its low level state, each of the diodes is forward biased and current flows from terminal 3 through resistor 4 and the diodes 5, 7 or 9 to maintain input terminal 12 at essentially 0 volt or ground. Each of the diodes 5, 7 and 9 are considered to have a low forward-conducting voltage drop. Since the potential at input terminal 12 remains at a constant amplitude, capacitor 1 does not conduct and transistor 8 remains cut-off because its base 27 remains more positive than its emitter 14. The application of a high or a low level trigger to diode 5, and for that matter, the application of a coincident high or low level signal to either diode 7 or 9, while the condition of binary 0 exists at any other fan-in information diode, does not alter this condition of quiescence.

Figure 2:
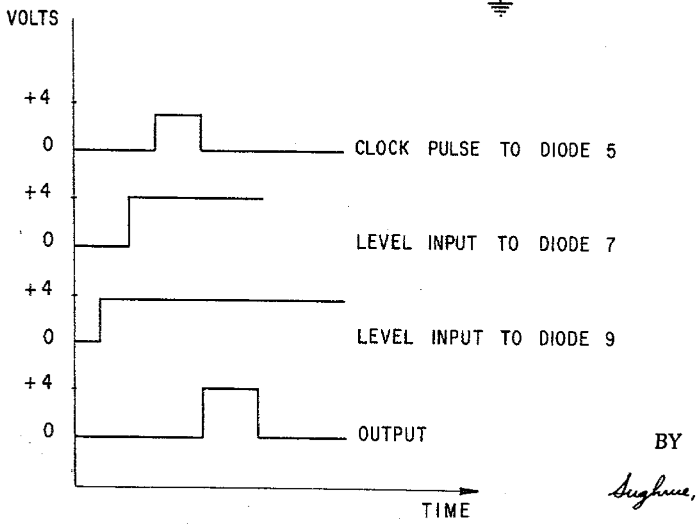
FIG. 2 represents the input signals applied to the circuit of FIG. 1 and the output signals obtained therefrom.

If a clock pulse occurs, i.e., the input diode 5 rises to binary 1 or its high level, coincident with the inputs to diodes 7 and 9 also being at a high level, as shown in FIG. 2, this positive-going step back-biases the diode 5 until terminal 12 rises to approximately +4 volts, the amplitude of the trigger pulse. The time required for terminal 12 to rise to +4 volts is determined by the RC time constant of resistor 4, capacitor 1, and resistor 28, which comprise the path for current flow from terminal 3 to terminal 16. When terminal 12 rises to +4 volts, it is clamped at this amplitude of potential by the forward conduction of diode 5. The clock pulse period is selected to be of a width in excess of the RC time constant of the charge path so as to permit terminal 12 to rise to +4 volts. During the time period required to charge capacitor 1, transistor 8 remains cut-off because of the charging current flowing through the capacitor. This charging current causes the base of transistor 8 to become more positive and therefore further reverse-biased than in the quiescent condition.

If, after the terminal 12 rises to +4 volts, the clock pulse ends, the diode 5 is once again forward-biased and the negative-going step of the clock pulse is transferred through capacitor 1 to the base 27 of transistor 8. Transistor 8 conducts for the period of time required for capacitor 1 to discharge by an amount equal to the +4 volt step at terminal 12 less the amplitude of the usual and normal reverse bias which is applied to the base of transistor 8. All base current applied to transistor 8 is amplified at its collector 18 by the current gain of the transistor and applied to the fan-out diodes 22, 24 and 26. Since collector current will flow over the same time interval as the base current, the charge on capacitor 1 is also amplified.

Since the charge on a capacitor is equal to the time-integral of current, the amplification of the charge on the capacitor may be illustrated by reference to the following expressions for $qC_1$, input charge, and $q_T$, output charge $$\frac{qC_1=\int_0^t i_b dt}{q_T=\int_0^t i_c dt}$$

where time is taken over the period required to discharge capacitor 1, $i_b$ is the current flowing into the base of the transistor 8, and $i_c$ is the current flowing out of the collector of the transistor.

Since the charge and/or current gain is independent of the capacitance of capacitor 1, a small capacitor 1 may be used for a given required output charge. The resultant small capacitance provides for a small RC time constant and therefore permits for the use of clock pulses of narrow width with attendant increased speed of operation.

The fact of charge gain permits plural fan-out loads to be driven by a single charge gate and provides for greater logic versatility and economy of assembly of logical elements. In addition, because the use of a small capacitor 1 reduces the charge load on a clock or trigger source, a plurality of gates according to the present invention may be driven from a single clock source.

The circuit described may be even further improved by the substitution of a diode 34 for the resistor 28. Utilization of the diode in the biasing circuit provides for an even smaller RC time constant and therefore even further increased operating speeds.

As mentioned above, the diode 11 is inserted into the gating circuit so as to suppress noises which might disturb the operation of the system by causing extraneous output pulses to be generated. Diode 11 provides a shunt path to ground for any negative-going signals which may occur at input terminal 12, thereby preventing such signals from interfering with the normal operation of the charge gate.

A resistance 36 may also be connected in the base lead of transistor 8 to adjust the width of the pulse output which is produced. By proper selection of the values of the passive components of the system, the effective shape of the output pulse may be varied. Also included, but not essential to the over-all understanding of the present gate, is capacitor 38 which serves as a bypass capacitor for the power supply from the constant current source associated with terminal 16.

In carrying out the invention according to the preferred embodiment, and by way of example only, the values of a particular set of components used are as follows:

| | | |
|---|---|---|
| $R_4$ | | 12K |
| $R_{28}$ | | 1K |
| $R_{21}$ | | .200K |
| $R_{30}$ | | 82K |
| $R_{36}$ | | .470K |
| $C_1$ | pf | 33 |
| $C_{38}$ | mf | 6.8 |
| $V_3$ | volt | 12 |
| $V_{12}$ | do | 4 |

Figure 3:
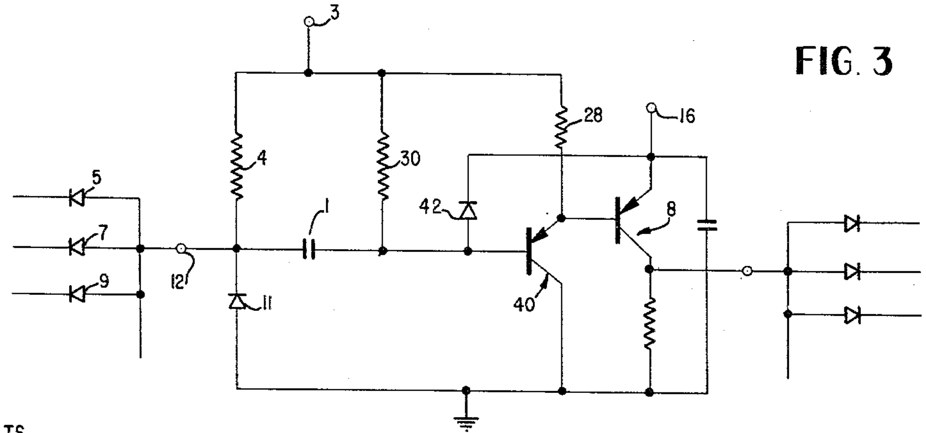
FIG. 3 is a circuit diagram similar to FIG. 1 which shows another embodiment of charge gate in accordance with this invention.

In the embodiment of FIG. 3 wherein the same reference numerals are used to designate the same or similar parts, a PNP transistor 40 is connected in circuit with the base lead of transistor 8. To this end, the transistor 40 has its base lead connected directly to the juncture of capacitor 1 and resistor 30, has its emitter connected to terminal 3 via the resistor 28, and has its collector connected directly to ground. A diode 42 provides a direct path for current from the base of transistor 40 to the terminal 16.

In this embodiment, the transistor 40 is seen to be connected in an emitter follower configuration, and by the arrangement shown is biased normally to a condition of conduction, i.e., its base is maintained more negative than its emitter terminal. Owing to the forward voltage drop across diode 42 and the forward voltage drop across the base-emitter junction of transistor 40, the base of transistor 8 is maintained more positive than its emitter, and, as in the embodiment of FIG. 1, transistor 8 is non-conductive in the quiescent condition of the circuit. Upon occurrence of a negative step at input terminal 12, as heretofore described, diode 42 becomes back-biased by the signal which biases the base of transistor 40 more negatively. Accordingly, the base of transistor 8 is biased more negative than its emitter upon this occurrence. Thus, the circuit of FIG. 3 produces output signals in exactly the same manner as that described heretofore with reference to FIG. 1.

Since the transistor 40 provides high input impedance, as is well known, and therefore a longer time constant, the capacitance of capacitor 1 can be even further reduced for a given required duration of output signal. Since transistor 40 is connected in the well known emitter-follower configuration and provides substantial current gain, less input current is required from the capacitor 1 to produce the same given amplitude of output signals. Alternatively, for the same amplitude of input signal from capacitor 1, the amplitude of the output signal will be significantly increased.

Resistor 30, it will be noted, is not required for purposes of biasing transistor 8. It therefore could be eliminated, but its elimination would result in the production of output pulses of relatively long time duration. For some applications, this may be desirable. If, on the other hand, narrower output pulses of uniform duration and of short fall-time are required, a resistor 30 of suitable value may be provided as shown to serve as a discharge patch for the capacitor 1 during the period of charge transfer. The relatively constant resistance of resistor 30 may be made so very small relative to the logarithmic impedance of the transistor 40 as to dominate. Consequently, the constant potential source connected to terminal 3 together with the constant resistance value of resistance 30 will provide a relatively constant current source for the capacitor 1; this circuit will insure that capacitor 1 always discharges at a relatively constant rate. Since capacitor 1 will discharge more quickly and at a uniform rate, narrower and more uniform output signals will be produced.

Moreover, as a result of the biasing arrangement through transistor 40 and diode 42 for the transistor 8, resistor 28 may be returned to the terminal 3 which is maintained at a relatively high amplitude of positive potential relative to the terminal 16. The resistor 28 thus provides a high current path for the base of transistor 8 which causes rapid turn-off of this transistor. As should be apparent, this path to terminal 3 provides for rapidly sweeping the stored charge or minority carriers from the base region of transistor 8.

Although the present invention has been described with reference to only the broad concept and two preferred embodiments including examples of specific values of components used, nevertheless, changes and modifications will occur to those skilled in the art which, in fact, do not depart from the teaching of the present invention. Such changes and modifications are deemed to be within the scope and spirit of the invention as defined in the appended claims.

I claim:

1. A charge gate comprising the combination of a transistor, a capacitor, an input circuit means including at least one information signal and at least one switching signal, and biasing means connected to said capacitor, said biasing means being coupled to the base of said transistor for normally maintaining said transistor non-conducting, logic gating means connected between said input circuit and said biasing means (1) for allowing said capacitor to be charged from said biasing means which charge is initiated upon the simultaneous occurrence of said switching signals and said information signals and (2) thereafter for discharging said capacitor at the termination of at least one of said signals, said capacitor being coupled between said logic gating means and said transistor and being of capacitive value for discharging substantially all of its charge through said transistor upon termination of said at least one signal, thereby to transfer said charge to said transistor to render said transistor conducting to provide an amplified transferred charge.

2. A charge gate according to claim 1 which includes a plurality of current conducting devices coupled to the output circuit of said transistor to provide fan-out of the output signal obtained therefrom.

3. A charge gate comprising a transistor having an output circuit, biasing means coupled to said transistor for normally rendering said transistor non-conducting, an input circuit including at least one current conducting device, a capacitor connected between said transistor and said input circuit, and switching signal means and information signal means coupled to said current conducting device to inhibit selectively said current conducting devices upon the simultaneous occurrence of switching signals and information signals to permit said capacitor to charge from said biasing means so that when said devices are uninhibited at the termination of at least one of said signals the charge on said capacitor is transferred to said transistor to overcome the bias on said transistor and render said transistor conducting to produce in said output circuit an amplified output charge corresponding to the charge accumulated on said capacitor, said capacitor being of capacitive value for charging during said simultaneous occurrence and for discharging substantially all of its charge at said termination of at least one of said signals.

4. A conditional gate comprising in combination a transistor, a capacitor, means connecting said transistor to one side of said capacitor, biasing means connected to the common point defined by the juncture of said transistor with said capacitor, said biasing means normally being effective to maintain said transistor in a back-biased condition, means connected to said biasing means for applying a potential signal to the other side of said capacitor, logic means to apply control signals to the common point defined by the juncture of said potential signal means and said other side of said capacitor, whereby upon occurrence of a control signal said capacitor is charged by said potential signal and upon subsequent termination of said control signal the charge on said capacitor overcomes the back-bias on said transistor and renders it conducting and said capacitor being of capacitive value for becoming substantially fully charged during the time duration of said control signal and for discharging substantially all of its charge upon subsequent termination of said control signal.

5. A conditional gate comprising in combination a normally non-conducting transistor including a base electrode, a collector electrode and an emitter electrode, a utilization circuit connected to said collector electrode; biasing means and a capacitor connected in common to the base electrode of said transistor, said biasing means normally being effective in maintaining said base electrode in a back-biased condition, and an input circuit including at least two two-terminal asymmetrically conducting devices for connecting a source of switching signal and a source of information signal to the other side of said capacitor, said device normally being biased to one condition of conductivity in the presence of both an information signal and a switching signal whereby said capacitor charges from said biasing means, said capacitor discharging to said base electrode to render said transistor conducting upon subsequent removal of the switching signal or the information signal which biases said corresponding device to another condition of conductivity, said capacitor having a substantially small capacitive value for becoming substantially fully charged during the time duration of said presence of both signals and for discharging substantially all of its charge upon subsequent removal of one of said signals.

6. A charge gate according to claim 5 wherein the one biased condition of said unidirectional conduction devices corresponds to a non-conducting condition and the other biased condition of said unidirectional conducting devices corresponds to a conducting condition.

7. A charge gate according to claim 5 wherein the other side of said capacitor and the one terminal of said asymmetrical conducting devices have a common connection to a source of potential and the conducting condition of said asymmetrical conducting devices determines the amplitude of potential appearing at the other side of said capacitor.

8. A charge gate according to claim 7 wherein the connection of said one terminal of said asymmertical conducting devices and said other side of said capacitor is made to said biasing means.

9. A charge gate according to claim 5 wherein said source of switching signal comprises a source of pulse information and said information signal sources each comprise a source of bilevel information.

10. A charge gate for storing and transferring an amplified version of an information input signal to the output thereof, said charge gate comprising a capacitor capable of storing a predetermined amount of charge thereon, a normally non-conducting transistor connected to one side of said capacitor, said transistor being rendered conductive upon the transfer thereto of an information signal in the form of an increment of the charge stored on said capacitor, the ouput signal from said transistor being an amplified version of the charge transferred thereto, said charge storage and transfer gate further comprising a plurality of input diodes connecting a corresponding plurality of information signals to the other side of said capacitor, said input diodes being normally forward biased and conducting in the absence of corresponding information signals, all said input diodes being reverse biased upon simultaneous occurrence of information signals at said plural diodes to charge said capacitor, whereby when an information signal is removed from at least one of said input diodes, the charge is transferred from said capacitor to the base of said transistor to render it conducting, said capacitor having a substantially small capacitive value for becoming substantially fully charged during the time duration of said simultaneous occurrence of information signals and for discharging substantially all of its charge when said information signal is removed.

11. A charge gate according to claim 10 in which a plurality of fan-out diodes are coupled to the output terminal of said transistor.

12. A conditional gate comprising in combination a normally non-conducting transistor including a base electrode, a collector electrode, and an emitter electrode, a utilization circuit connected to said collector electrode, biasing means and a capacitor connected in common to the base electrode of said transistor, said biasing means including another transistor and being normally effective to maintain said base electrode of said first-named transistor in a back-biased condition, and an input circuit including at least two one-terminal asymmetrically conducting devices for connecting a source of switching signal and a source of information signal to the other side of said capacitor, said devices normally being biased to one condition of conductivity in the presence of both an information signal and a switching signal whereby said capacitor charges from said biasing means, said capacitor discharging to said other transistor whereby said first-named transistor is rendered conducting upon subsequent removal of the switching signal or the information signal which biases said corresponding device to another condition of conductivity for a time interval until said capacitor is discharged, said capacitor having a substantially small capacitive value for becoming substantially fully charged during the time duration of said presence of both of said signals and for discharging substantially all of its charge upon subsequent removal of one of said signals.

13. A conditional gate according to claim 12 wherein said other transistor is connected in an emitter-follower configuration having its base electrode connected directly to said capacitor.

14. A charge gate comprising the combination of a transistor having at least an emitter, a base, and a collector, input circuit means connected to said base of said transistor to provide information signals each of which input signals is in a direction to nonconductively bias said transistor, biasing means coupled to said base of said transistor for normally maintaining said transistor nonconductive, a capacitor being coupled between said transistor and said input circuit means, logic gating means connected between said capacitor and said input circuit means and responsive to said signals for allowing said biasing means to charge said capacitor, which charge is initiated upon the simultaneous occurrence of all said signals and for discharging said capacitor at the termination of said simultaneous occurrence of all of said input signals, and said capacitor being of capacitive value for transferring substantially all of its stored charge to said transistor for discharge of said capacitor upon said termination of said simultaneous occurrence of signals thereby to render said transistor conductive for a time interval until said capacitor is discharged to produce an amplified transferred charge having a magnitude of charge determined by the capacity of said capacitor.

References Cited by the Examiner

UNITED STATES PATENTS

| | | | |
|---|---|---|---|
| 2,891,172 | 6/59 | Bruce et al. | 307—88.5 |
| 2,964,653 | 12/60 | Cagle et al. | 307—88.5 |
| 3,092,729 | 6/63 | Cray | 307—88.5 |
| 3,105,225 | 9/63 | Williams et al. | 307—88.5 |

OTHER REFERENCES

Computer Control Company Publication, "Proceedings of First User's Conference on Dynamic Digital Logic" (pages 24 and 31 relied on), March 1960.

Control Engineering (Magazine), May 1957 (page 82 relied on).

Electronics (Magazine), July 15, 1960, vol. 33, No. 29 (page 90 relied on).

Hurley: Transistor Logic Circuits, Wiley & Sons, Oct. 10, 1961, pages 167–169 (page 168 relied on).

Milliman et al.: Pulse and Digital Circuits, McGraw-Hill, 1956 (page 398 relied on).

ARTHUR GAUSS, *Primary Examiner.*